UNITED STATES PATENT OFFICE.

WILHELM HERZBERG, OF WILMERSDORF, AND WERNER LANGE, OF TREPTOW, GERMANY, ASSIGNORS TO ACTIEN GESELLSCHAFT FÜR ANILIN FABRIKATION, OF BERLIN, GERMANY.

DIAZOTIZABLE DISAZO DYES FOR COTTON.

1,078,504.  Specification of Letters Patent.  Patented Nov. 11, 1913.

No Drawing.  Application filed October 21, 1912.  Serial No. 727,014.

*To all whom it may concern:*

Be it known that we, WILHELM HERZBERG and WERNER LANGE, citizens of the German Empire, residing, respectively, at Wilmersdorf, near Berlin, Germany, and Treptow, near Berlin, Germany, have invented new and useful Improvements in Diazotizable Disazo Dyes for Cotton, of which the following is a specification.

We have found that new dyes corresponding to the formula:

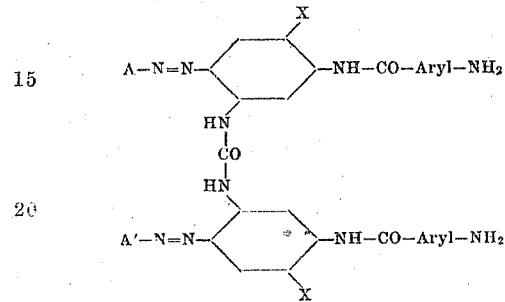

where A and A' stand for the residues of aromatic acids and X for a univalent radical which dye cotton generally yellow to orange and may be further diazotized in substance or on the fiber and coupled with suitable azo compounds are obtainable as follows: The disazo dyes derived from one molecular proportion of a symmetrical 3.3'-diaminodiarylurea of the benzene series and two molecular proportions of diazotized aromatic amino-acids are acidylized in both free amino groups with a nitroarylcarboxylic acid halid whereupon the nitro groups are reduced.

Example: 326 parts by weight of the dye sulfanilic acid-disazo-3.3'-diaminodiphenylurea are dissolved in water. After addition of 60 parts of calcined sodium carbonate there are introduced 200 parts of 3-nitrobenzoyl chlorid. As soon as acetic acid no longer produces a change of color in a sample the proportion of $Na_2S_2$ solution calculated for reducing the nitro groups is added, the mixture is warmed for half an hour at 90° C. and the produced dye is salted out.

The constitution of the dye is expressed by the formula:

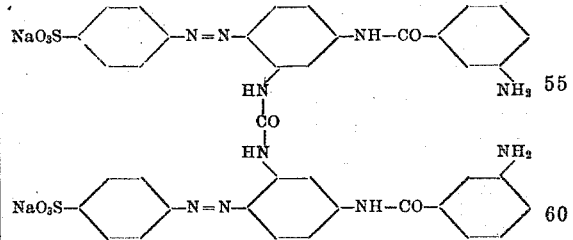

In the starting material one or both molecules of the sulfanilic acid may be replaced by another amino-acid, for instance metanilic acid, anisidin-sulfonic acid, a chloroanilin-sulfonic acid, an amino-benzoic acid, a naphthylamin-sulfonic acid; also other 3.3'-diaminodiarylureas, for instance 3.3'-diaminoditolylurea, 3.3'-diamino-4.4'-dichlorodiphenylurea may be used. Instead of 3-nitrobenzoyl chlorid, for example, the 4-nitrobenzoyl chlorid may be employed.

The dyes obtained by the aforesaid process dye cotton directly yellow to orange. When diazotized on the fiber and developed with 2-naphthol there are produced orange to red tints of good fastness to washing.

The new dyes in the dry and pulverized shape of their sodium salts are orange powders easily soluble in water to a yellow solution not being altered by soda-lye or ammonia but from which hydrochloric acid separates the yellow dye acids. They are practically insoluble in alcohol. From their red-brown solution in concentrated sulfuric acid on addition of ice brown flakes are separated. By heating with zinc-dust the aqueous solution is decolorized, the dye being split, yielding the same aromatic amino-acids from which the diazo compounds were prepared, and a bis-aminoarylacidylated 3.3'.6.6'-tetraaminodiarylurea.

Having now described our invention what we claim is,—

1. The herein-described process for the manufacture of diazotizable disazo dyes for cotton which consists in acidylizing with a nitroarylcarboxylic acid halid the disazo compounds derived from one molecular proportion of a symmetrical 3.3′-diaminodiarylurea of the benzene series and two molecular proportions of diazotized aromatic amino-acids and subsequently reducing the nitro groups.

2. The herein-described new diazotizable disazo dyes corresponding to the formula:

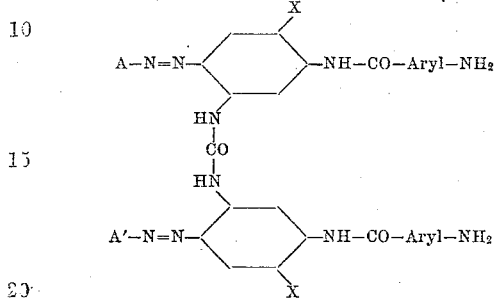

where A and A′ stand for the residues of aromatic acids and X for a univalent radical, these dyes by the reduction yielding aromatic amino-acids and symmetrical di-aminodiaryldiacidyl - 3.3′.6.6′ - tetraaminodiarylurea of the benzene series.

3. The herein-described new diazotizable disazo dye as sodium salt corresponding to the formula:

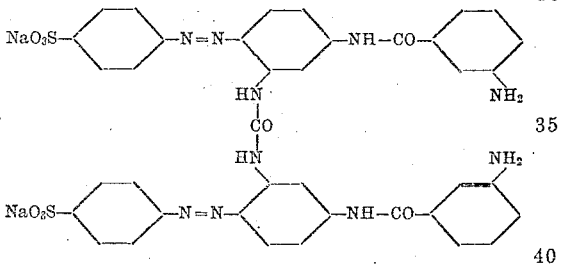

and yielding by the reduction sulfanilic acid and symmetrical 3.3′ - diaminodibenzoyl-3.3′.6.6′-tetraaminodiphenylurea.

In testimony whereof we have signed our names to this specification in the presence of two subscribing witnesses.

WILHELM HERZBERG.
WERNER LANGE.

Witnesses:
HENRY HASPER,
WOLDEMAR HAUPT.

---

Copies of this patent may be obtained for five cents each, by addressing the "Commissioner of Patents, Washington, D. C."